March 24, 1931. J. MILLRAY 1,797,874
TRUCK PLATFORM
Filed Jan. 2, 1930
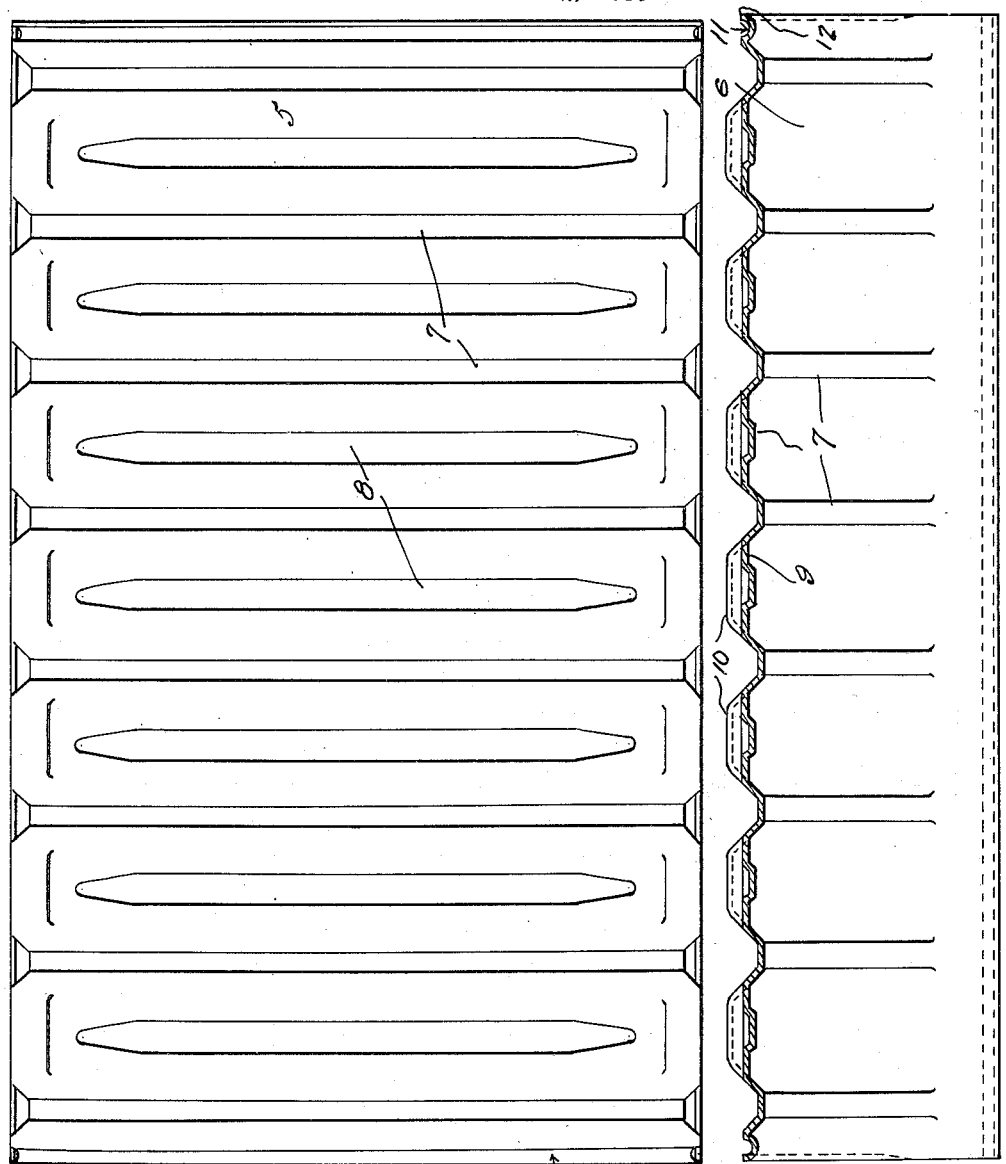
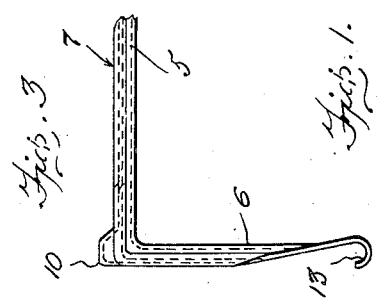
Inventor
J. Millray
By *Clarence A. O'Brien*
Attorney Patented Mar. 24, 1931

1,797,874

UNITED STATES PATENT OFFICE

JOSEPH MILLRAY, OF HOMEWOOD, ILLINOIS, ASSIGNOR OF ONE-HALF TO RAYMOND ROBERT KANE, OF CHICAGO, ILLINOIS

TRUCK PLATFORM

Application filed January 2, 1930. Serial No. 418,053.

The present invention relates generally to platforms employed in factories and the like intended to receive articles thereon to be transported from one part of the factory to another and adapted to have a truck placed thereunder and elevated in order to lift the platform with a load thereon, clear the floor or ground, so that the said platform can be transmitted upon the truck.

The object of the invention is to provide a sheet metal platform which is capable of being manufactured at relatively low cost and which at the same time embodies strength and durability.

One of the important objects of the present invention is to provide a truck platform of this character which may be constructed from sheet metal and shaped into its desired form by a punch press to provide reinforcing corrugations extending transversely of the top of the platform and along its vertical side to a point immediately above its lower edge and forming skids at the lower side edges of the platform, of a width corresponding to the depth of the corrugations whereby the outside dimensions of these skids are equal to the extreme width of the platform so that the sides of two or more platforms will not interfere to prevent movement in close quarters.

Other objects and advantages reside in the special construction, combination and arrangement of the various elements forming the invention as more fully hereinafter described and claimed, reference being had to the accompanying drawings forming part hereof, wherein like numerals refer to like parts throughout, and in which:

Figure 1 is a top plan view,

Figure 2 is a longitudinal sectional view, and

Figure 3 is a fragmentary end elevational view.

Referring now to the drawings in detail the invention comprises a truck platform indicated generally at 5 which is formed of sheet metal with its longitudinal side edges bent downwardly to provide a pair of upright sides or legs 6 which extend unbroken throughout the length of the platform.

The surface of the platform is provided at spaced intervals with corrugations 7, the corrugations extending over the upper corners to extend partly down the sides of the legs 6 and terminate short of the lower edge thereof. The corrugations extend transversely of the platform.

The upper surface of the platform, between the corrugations 7, is also provided with relatively short corrugations 8 which have their ends terminating short of the sides of the platform.

The corrugations are arranged substantially in the form of hills and valleys running transversely of the platform and extending upwardly from the hills, designated at 9, adjacent the side edges of the platform, are formed upstanding ribs 10 which extend longitudinally in spaced parallel relation with respect to the side edges of the platform and slightly outwardly of the end of the short corrugations 8, to provide stops for the material carried on the platform to prevent sliding of the material over the side edges.

The forward and rearward edges of the platform are formed with a relatively shallow channel 11 having its outer edge portion upturned as shown at 12, the depth of the channel being slightly less than the depth of the valleys of the corrugations whereby to facilitate the riding of the lifting truck under the edges of the platform preparatory to elevating and moving the platform.

The channelling of the material at the ends of the platform also serve to strengthen the same to withstand heavy shock by the striking of the lifting truck against the edges of the platform.

The lower side edges of the legs 6 are curved outwardly and upwardly as shown at 13 to form skids at the lower side edges of the platform to facilitate the sliding movement of the platform over the surface of the floor or ground upon which the same may be positioned.

As more clearly illustrated in Figure 3 of the drawings, the outer edge of the skid terminates in a vertical plane with the hills of the corrugations so that the outside dimension of the skids and the corrugations will be uniform.

Thus when two or more of the platforms are placed side by side no obstructions on the platform will interfere with the sliding thereof with respect to each other.

It will be obvious from the foregoing that the truck platform constructed in accordance with my invention may be manufactured at relatively low cost and at the same time will possess the desired features of strength and facility for moving the same about.

It is obvious that my invention is susceptible to various changes and modifications in construction without departing from the spirit of the invention or the scope of the appended claims, and I accordingly claim all such forms of the device to which I am entitled.

Having thus described my invention, what I claim as new is:

1. A truck platform of the class described constructed of a single sheet of metal having its side edges bent downwardly to form legs, corrugations extending transversely of the platform and continuing unbroken over the side edges and terminating short of the lower edge of the leg, said legs having their lower edges bent outwardly and upwardly to form skids having outside dimensions corresponding to the outside dimensions of the corrugations and upstanding ribs formed in the upper surface of the platform adjacent the side edges thereof.

2. A truck platform of the class described constructed of a single sheet of metal having its side edges bent downwardly to form legs, corrugations extending transversely of the upper surface of the platform and continuing unbroken over the longitudinal side edges and terminating short of the lower edge of the leg, said corrugations being in the form of alternative hills and valleys, and a relatively shallow channel formed at the front and rear edges of the platform of a depth less than the depth of the valleys of said corrugations, said channels being provided with upstanding outer edges, said legs having their lower edges bent outwardly and upwardly to form skids having an outside dimension corresponding to the outside of the hills of said corrugations, and longitudinally extending ribs formed on the upper surface of the hills of said corrugations and disposed inwardly of the side edges of the platform.

In testimony whereof I affix my signature.

JOSEPH MILLRAY.